United States Patent [19]

Derderian

[11] 4,288,314
[45] Sep. 8, 1981

[54] APPARATUS FOR SEPARATING ADHERING DRIED FRUITS AND THE LIKE

[76] Inventor: Edward J. Derderian, 4514 N. Wilson Ave., Fresno, Calif. 93704

[21] Appl. No.: 182,953

[22] Filed: Sep. 2, 1980

[51] Int. Cl.³ .............................................. B07B 13/16
[52] U.S. Cl. ....................................... 209/3; 209/236; 222/198
[58] Field of Search .................... 209/1, 2, 3, 235, 236, 209/311, 360; 222/198, 199

[56] References Cited

U.S. PATENT DOCUMENTS 3,215,314 11/1965 Haley ............................... 222/199 X

FOREIGN PATENT DOCUMENTS 2321998 11/1973 Netherlands ........................ 222/198
2,730,637 1/1979 Netherlands ........................ 222/198

Primary Examiner—William A. Cuchlinski, Jr.
Attorney, Agent, or Firm—Huebner & Worrel

[57] ABSTRACT

An apparatus for separating clumps of adherent dried fruits or the like, the apparatus having a pair of planar friction members mounted in downwardly convergent, facing relation for independent elevational movements to receive clumps of fruit therebetween and having a driving mechanism for oscillating the members alternately and oppositely to separate the fruits by rubbing action of the members in engagement with clumps of the fruits received between the members.

6 Claims, 4 Drawing Figures

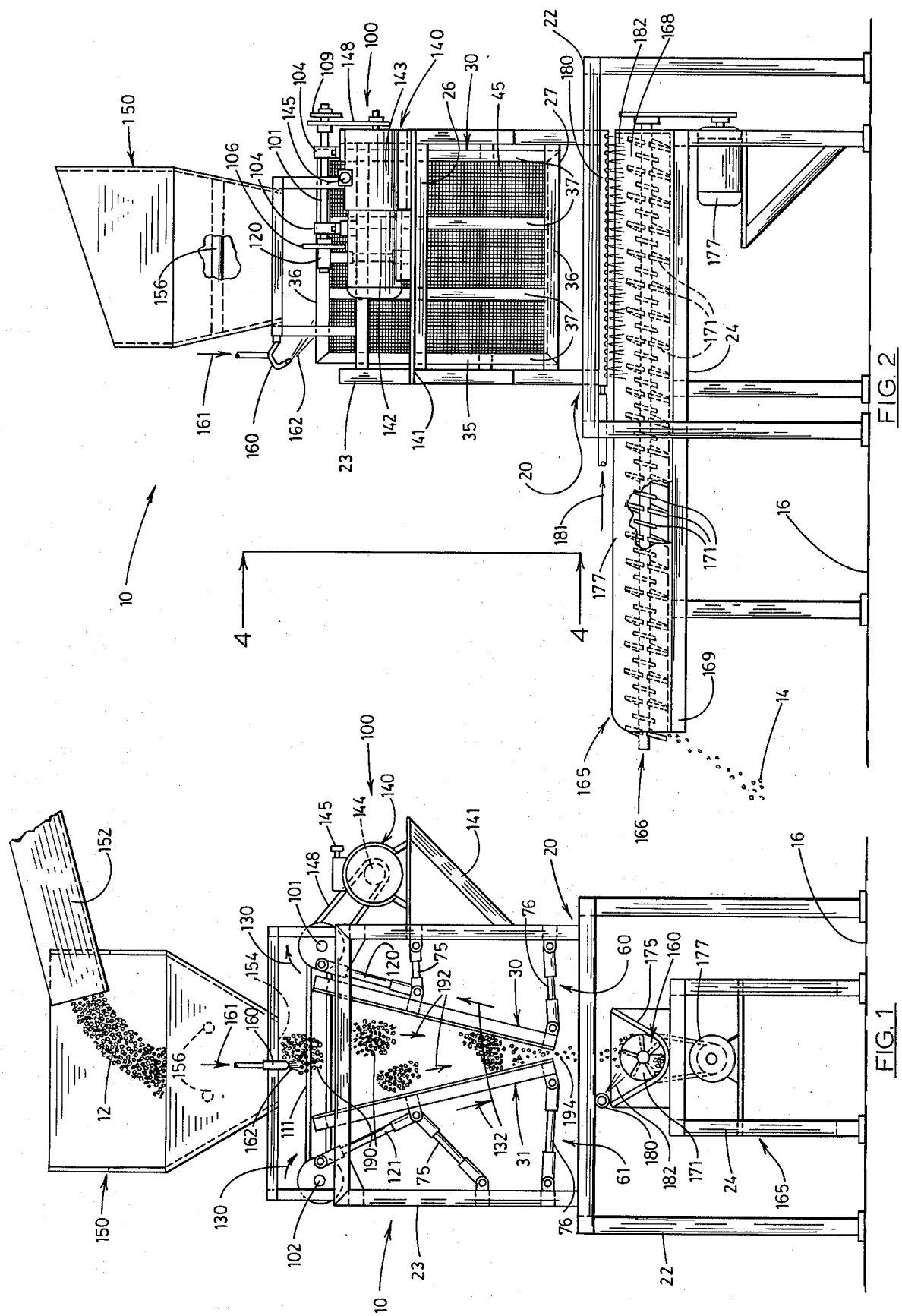

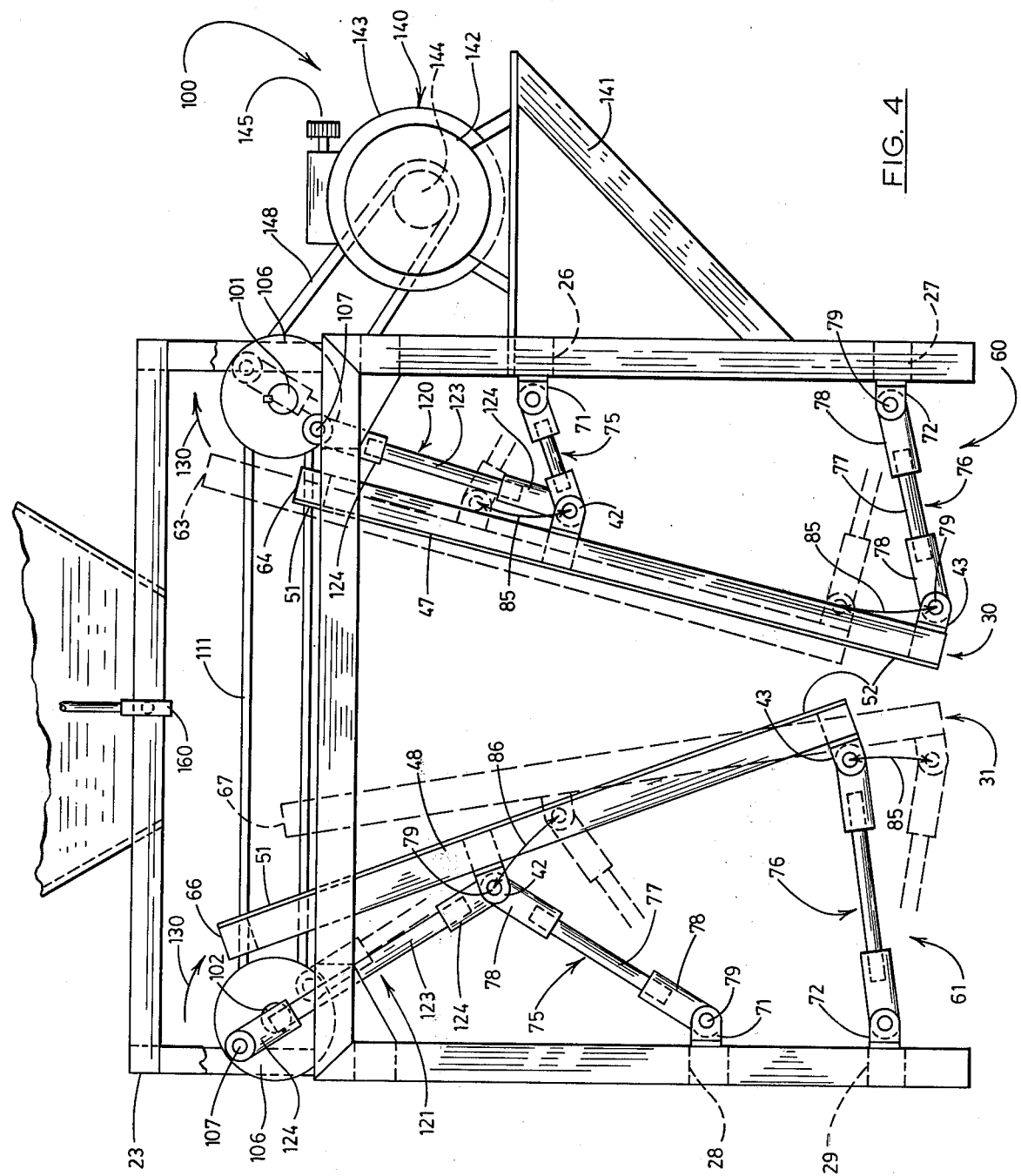

APPARATUS FOR SEPARATING ADHERING DRIED FRUITS AND THE LIKE

BACKGROUND OF THE INVENTION

1. Field of the Invention

The present invention relates to an apparatus for separating adhering dried fruits, and more particularly to such an apparatus for use in separating such fruits compacted into relatively large clumps or bricks for packaging, shipping, storage, or other purpose.

2. Description of the Prior Art

Dried fruits, particularly raisins but also dried apricots, peaches, prunes, dates, and the like, are sticky and adherent so that when compressed for packaging, such products tend to adhere in clumps. Such dried fruits are not only adherent, but are relatively tender and easily damaged. However, advantage is taken of the adherent qualities of dried fruits in transporting raisins and the like to foreign markets, the raisins being deliberately compacted to save space into relatively large bricks having a weight in the order of 100 kilograms.

Insofar as is known to the applicant, prior to the present invention there was no economically feasible method or apparatus for breaking up such clumps or bricks which effectively separated the fruits without damaging them or giving a mass thereof an undesirable consistency. It is, of course, possible to separate adhering dried fruits manually, but the labor cost is excessive. It is known that clumps of adhering dried fruits can be separated by subjection to steam. However, fruits so separated have softened exteriors which are excessively tender while the interiors are undesirably hard.

PRIOR ART STATEMENT

In conformance with 37 C.F.R. 1.97 and 1.98, the applicant states that he is not aware of any prior art which is relevant to the patentability of the subject invention.

SUMMARY OF THE INVENTION

It is an object of the present invention to provide an improved apparatus for separating adhering dried fruits and the like.

Another object is to provide such an apparatus which effectively separates such fruits which are disposed in clumps or are compacted into bricks of even considerable weight.

Another object is to provide such an apparatus which effectively separates the fruits without significant damage to them.

Another object is to provide such an apparatus which does not form a fruit mass of undesirable consistency.

A further object is to provide an apparatus for separating adhering dried fruits which is easily kept in a sanitary condition and is economical, durable, and fully effective in accomplishing its intended purposes.

BRIEF DESCRIPTION OF THE DRAWINGS

FIG. 1 is a side elevation of an apparatus embodying the principles of the present invention depicted in a representative operating environment.

FIG. 2 is an elevation of the apparatus as viewed from a position at the right side of FIG. 1 with portions broken away for illustrative convenience.

FIG. 4 is a somewhat further enlarged fragmentary elevation of the apparatus taken from the position of line 4—4 of FIG. 2 with alternate positions of the friction members depicted in dashed lines.

DESCRIPTION OF THE PREFERRED EMBODIMENT

Figure 3:
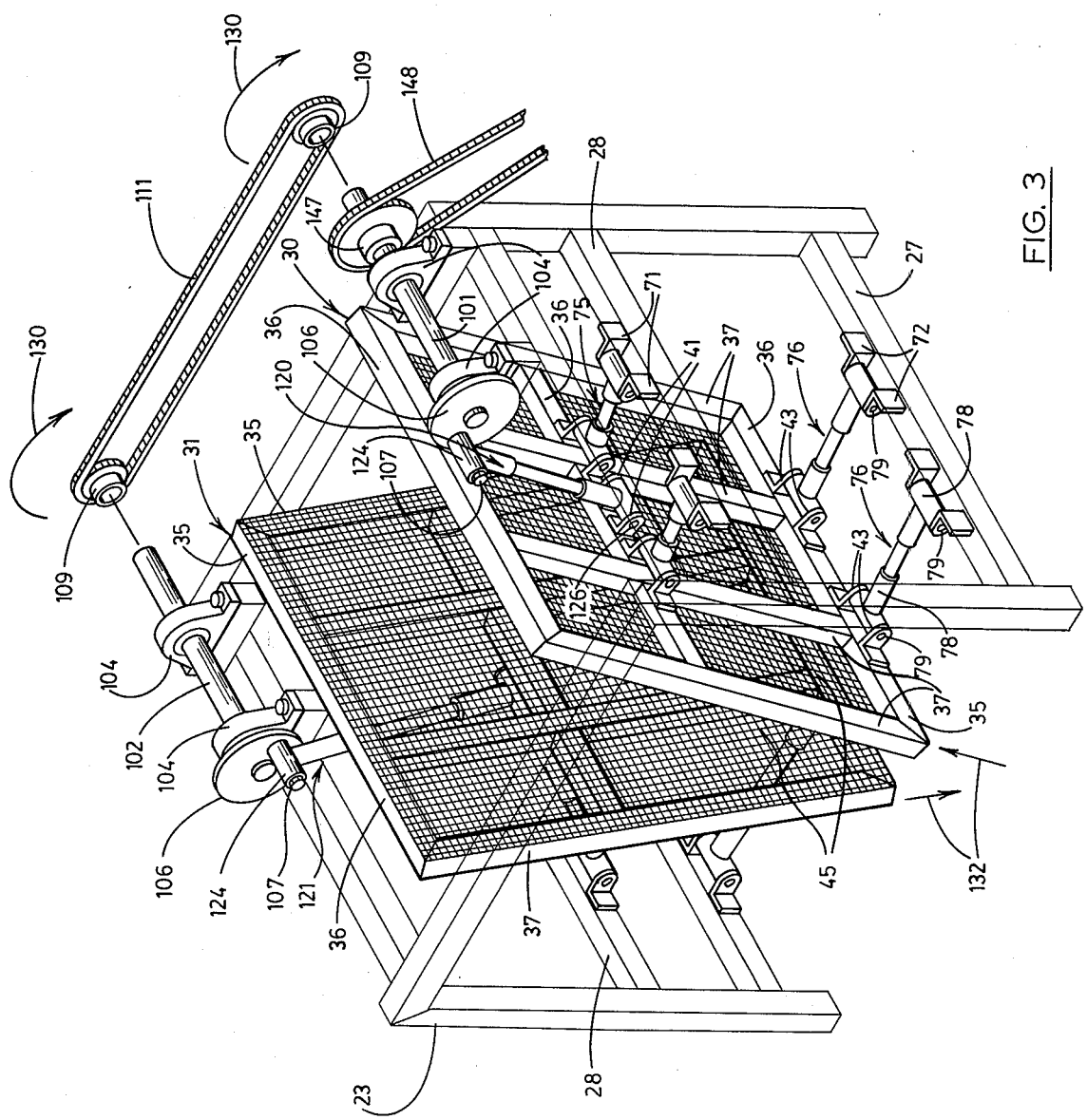
FIG. 3 is a fragmentary, partially exploded, perspective view of the apparatus at a somewhat enlarged scale showing planar friction members used therein with associated elements.

Referring with greater particularity to the drawings, in FIGS. 1 and 2 is shown an apparatus 10 which embodies the principles of the present invention. The apparatus separates clumps 12 of adherent dried fruits, or the like, into individual fruits 14 and is depicted as rested on a floor 16.

The apparatus 10 has a frame 20 which includes a first subframe 22, a second subframe 23, and a third subframe 24, each subframe being constructed of bars arranged in rectangular parallelpiped configuration. The first subframe is rested on the floor 16 and directly supports the second subframe. These two subframes are approximately equal in height. The second subframe includes an upper first support or bar 26, a lower first support or bar 27, an upper second support or bar 28, and a lower second support or bar 29. These bars are horizontal and substantially parallel. The first bars are at the side of the subframe disposed toward the right-hand side of FIGS. 3 and 4, and the second bars are disposed toward the left-hand side of these figures. The lower bars are disposed toward the bottom of the second subframe at substantially the same elevation. The upper of the first bars is disposed substantially above the upper of the second bars. The third subframe is rested on the floor and is disposed centrally within the first subframe substantially below the second subframe.

As best shown in FIGS. 3 and 4, the apparatus 10 has a first friction member 30 and a substantially identical second friction member 31. These members are positioned within the second subframe 23 with the first member being disposed toward the first bars 26 and 27 and the second member toward the second bars 28 and 29. Each member includes a planar, approximately square frame 35. This frame is rigidly constructed of three spaced horizontal bars 36 fixedly connected to four substantially equally spaced inclined bars 37. One side of each frame is disposed toward the adjacent pair of the bars 26 through 29 and this side is provided with pairs 41, 42, and 43 of horizontally aligned lugs. Two pairs 41 and one pair 42 are mounted on the central horizontal bar with the one pair disposed between the central pair of inclined bars and the two pairs disposed oppositely of the one pair and individually straddling the central pair of inclined bars. Two pairs 43 of the lugs are mounted on the lower one of the horizontal bars individually beneath the pairs 42.

The side of each frame 35 opposite the side bearing the pairs 41, 42, and 43 of lugs is entirely covered with a sheet 45 of woven wire mesh material tautly stretched over the frame. The openings between the wires are substantially smaller than the individual fruits 14. This sheet is preferably constructed of stainless steel wires. The sides of these sheets opposite the pairs of lugs individually provide a first textured planar surface 47 of the first friction member 30 and a second textured planar surface 48 of the second friction member 31. The first member is mounted on the first bars 26 and 27 and the second member is mounted on the second bars 28 and 29 in a manner subsequently to be described. The textured surface of each member is disposed oppositely of the member from the corresponding pair of these bars. The members are mounted so that the textured surfaces are disposed in horizontally spaced, facing relation and are substantially normal to a vertical plane of reference extending transversely between the surfaces. Each of these surfaces thus has an upper portion 51 and a lower portion 52. The corresponding portions are in approximate horizontal alignment and the upper portions spaced substantially farther apart than the lower portions so that the surfaces are inclined and upwardly diverge.

The first member 30 and the second member 31 are mounted on the subframe 23, respectively, by a first linkage 60 and a second linkage 61 for independent, upwardly and downwardly oscillating elevational movements. These assemblies guide the members so that their movements are substantially parallel to the respective surfaces 47 and 48. In FIG. 4, the first member is depicted in dashed lines at the upper extremity 63 of its movement and in solid lines at the lower extremity 64 of its movement. The second member is depicted in solid lines at the upper extremity 66 of its movement and in dashed lines at the lower extremity 67 thereof. The members are depicted in FIGS. 1, 2, and 3, approximately at the midpoints of their respective movements. Each linkage includes two pairs 71 of horizontally aligned upper lugs mounted on the corresponding one of the upper bars 26 or 28 and two pairs 72 of horizontally aligned lower lugs mounted on the corresponding one of the lower bars 26 or 28. Each of the upper pairs is aligned in a direction along these bars with a corresponding one of the upper pairs 42 of lugs, and each of the lower pairs of lugs is similarly aligned with a pair 43 of lugs.

Each linkage 60 and 61 includes a pair of substantially identical, elongated upper links 75, which extend individually between each of the corresponding pairs 42 and 71 of lugs, and a pair of substantially identical, elongated lower links 76 which extend individually between each of the corresponding pairs 43 and 72 of lugs. The linkages of each pair are substantially parallel. Each link has a central rod-like portion 77 having opposite screw-threaded ends and a pair of T-shaped opposite end portions 78. Each end portion provides a central section, which screw-threadably engages one of the ends of the central portion of the link, and a transverse section which extends between the corresponding pair of lugs. The transverse section is pivotally interconnected to the lugs by a pin 79 extending horizontally through the pair of lugs and the transverse section. The upper and the lower links corresponding to each of the friction members 30 and 31 are, therefore, vertically spaced, and the opposite ends of each link are individually pivotally connected to the corresponding friction member and to the corresponding one of the bars, 26 through 29, of the second subframe 23. The links thus individually connect the upper portions 51 and lower portions 52 of the textured surfaces 47 or 48 with the second subframe 23.

As best shown in FIG. 4, the dimensions and proportions of the first member 30, the second member 31, the second subframe 23, and the links 75 and 76 are such that the four links corresponding to the lower portions 52 and the two links corresponding to the upper portion 51 of the second surface 48 extend generally horizontally and move through relatively small, substantially equal angles above and below the horizontal as the members oscillate between the respective extremities 63, 64, 66, or 67 of their movements. The end portions 78 of these six links adjacent to the members thus move in individual, substantially vertical arcuate paths 85. Therefore, the first member and its textured surface remain in substantial parallelism to a first predetermined reference plane as the member moves between the extremities of its oscillating movement. These proportions and dimensions are such that the pair of upper links 75 corresponding to the upper portion 51 of the second surface 48 are inclined substantially upwardly from the upper second bar 28 toward the second member when this member is at the lower extremity 67 of its oscillating movement. As a result, this upper portion moves in an arcuate path 86 which extends upwardly away from the first member and the second surface moves in a path which is generally along a second predetermined reference plane inclined in downwardly convergent relation to the first predetermined reference plane.

Due to the relative disposition of the paths 85 and 86, as the second member 31 moves upwardly in its oscillating movement, the upper portion 51 of the second surface 48 moves horizontally substantially away from the corresponding portion of the first surface 47; the angle of inclination of the second surface to the horizontal decreases; and the included angle between the second member and the first member 30 increases. During this upward movement, the upward inclination of the pair of the upper links 75 connecting the second member to the upper second bar 28 increases and the upper portion of this member moves toward this bar. As the second member moves downwardly in its oscillating movement, the directions of these movements reverse with the upper portion of the second surface moving toward the upper portion of the first surface and away from the second bar, with the angle of inclination of the second surface to the horizontal increasing, with the included angle between the members decreasing, and with the upward inclination of the pair of links connected to the upper portion of the second surface decreasing. During the movements of the second member, its lower portion 52 moves horizontally a substantially shorter distance than its upper portion because of the above-described angular movement and generally horizontal disposition of the pair of the links 76 connected to the lower portion.

The apparatus 10 is provided with a power drive mechanism indicated generally by the numeral 100 and best shown in FIGS. 2, 3, and 4. This mechanism is mounted on the second subframe 23 and includes a first crankshaft 101, for driving the first friction member 30 and a second, substantially identical crankshaft 102 for driving the second friction member 31. Each crankshaft is rotationally received in a pair of bearing blocks 104 mounted on the subframe for rotation about a horizontal axis parallel to the textured surfaces 47 and 48. Each crankshaft is disposed outwardly of the subframe from the corresponding one of the upper portions 51 of these surfaces. Each crankshaft is spaced from the corresponding friction member a distance such that a plane of reference, which is parallel to the textured surface of the member when the member is at the upper extremity 63 or 66 of its movement and which passes through the pair 41 of lugs on the member, substantially intersects the crankshaft. One end of each crankshaft is provided with a disc 106 secured to the shaft for rotation therewith. The disc is provided with a crank pin 107 which is aligned in a direction along the bars 36 with the corresponding pair 41 of lugs. The ends of the crankshafts opposite the disc are individually provided with sprockets 109 secured to the crankshafts for rotation therewith. These sprockets are of the same diameter and are interconnected so as to rotate simultaneously at the same angular velocity by an endless chain 111. The relative angular positions of the crankshafts are thus maintained constant by the sprockets and chain and these positions are such that, at the point in their rotation depicted in dash lines in FIG. 4, their respective crank pins are also substantially intersected by their respective planes of reference just described. Each crank pin is, of course, again substantially intersected by the corresponding one of these planes when the crankshafts have rotated one-half of a revolution to the positions depicted in solid lines in FIG. 4.

As best shown in FIGS. 3 and 4, the drive mechanism 100 includes a first connecting rod 120 and a second connecting rod 121 individually related, respectively, to the first crankshaft 101 and the second crankshaft 102. Each rod is similar to one of the links 75 or 76, having a central rod-like portion 123 and opposite T-shaped ends or end portions 124 which screw-threadably engages the central portion. One end portion of each rod is pivotally connected to the corresponding one of the crank pins 107. The opposite end portion of each connecting rod is disposed between the pair 41 of lugs of the adjacent one of the friction members 30 or 31 and is pivotally connected to the pair of lugs by a pin 126. Being so connected, each connecting rod is generally parallel to the adjacent friction member.

The lengths of the central portions 123 of the connecting rods 120 and 121 are such that, when the crankshafts 101 and 102 are at the point in their rotation depicted in dashed lines in FIG. 4, the first friction member 30 is substantially at the upper extremity 63 of its oscillating movement and the second friction member 31 is substantially at the lower extremity 67 of its oscillating movement. Therefore, when the crankshafts have rotated one-half of a revolution from this point, the first member is brought substantially to the lower extremity 64 of its movement and the second member to the upper extremity 66 of its movement. Referring now to FIGS. 1 or 3, where each crankshaft is depicted in an angular position centrally between its positions depicted in solid lines and in dash lines in FIG. 4, it is seen that, when the crankshafts rotate in the direction indicated by the arrows 130, the friction members move simultaneously and in opposite directions upwardly and downwardly as indicated by the arrows 132 in FIGS. 1 and 3. When the crankshafts have rotated one-half of a revolution from the positions depicted in FIGS. 1 and 3, each member is moving in a direction opposite to that indicated by the arrows 132. The members thus move in alternate directions during each revolution of the crankshafts and their textured surfaces 47 and 48 move in opposite directions in relation to each other whether any given one of the members is traveling upwardly or downwardly in its movement determined by the corresponding arcuate paths 85 or 86.

The drive mechanism 100 includes a power drive unit 140, best shown in FIGS. 2, 3, and 4. The unit is of any suitable type and is mounted on a bracket 141 fixedly connected to the second subframe 23 outwardly of the first member 30. The unit includes a motor 142, a variable speed transmission 143, and a driving sprocket 144. The sprocket is continuously driven through the transmission by the motor in the rotational direction indicated by the arrows 130. The transmission is provided with a knob 145 for selective control of the rotational speed of the sprocket. The drive mechanism includes a driven sprocket 147 mounted on the first crankshaft 101 for rotation therewith and disposed thereon axially inwardly of the corresponding sprocket 109. The driving and driven sprockets are interconnected in rotational driving relation by an endless chain 148. Since the second crankshaft 31 is rotationally driven from the first crankshaft through the chain 109 and since the crankshafts drive the friction members 30 and 31, respectively, through the connecting rods 120 and 121, the drive unit continuously motivates the members in their respective oscillating movements.

The apparatus 10 includes a supply hopper 150, shown in FIGS. 1 and 2, mounted in the subframe 23 above the friction members 30 and 31. The hopper is upwardly open to receive the clumps 12 of adhering dried fruits from any suitable source thereof indicated by the numeral 151. The lower portion of the hopper is downwardly constricted to a rectangular discharge opening 154 which is disposed above and centrally between the textured surfaces 47 and 48. The constricted portion of the hopper is provided with a pair of spaced circular bars 156 which extend across it in a direction parallel to the crankshafts 101 and 102 and are spaced approximately equally from each other and from the sides of the hopper.

The apparatus 10 is provided with a first spray head 160 mounted on the subframe 23 adjacent to the opening 154 at the side thereof opposite the sprockets 109. The head is connected to a source, indicated by the arrow 161, of any suitable liquid, typically water, under pressure. The head is disposed so as to direct a spray 162 of the liquid between the surfaces 47 and 48.

The apparatus 10 includes a receiving assembly 165 mounted on the third subframe 24 and spaced downwardly of the lower portions 52 of the textured surfaces 47 and 48. This assembly includes a horizontal auger 166 having a shaft which is rotationally mounted on the subframe and extends in a direction centrally between the surfaces. The auger has a receiving end 168 disposed beneath these surfaces and extends therefrom to a discharge end 169 spaced substantially outwardly of the first subframe 22. The auger has a plurality of helical flights 171 spaced axially along the shaft. The receiving assembly includes a U-shaped trough 175 in which the auger is downwardly received. The trough is coextensive with the auger. The receiving assembly has a drive mechanism 177 mounted on the third subframe at the receiving end of the auger. This mechanism includes a driven pulley mounted on the shaft outwardly of the trough, a motor beneath the trough providing a driving pulley aligned with the driven pulley, and a belt rotationally connecting the pulleys by which the mechanism rotates the auger so as to transport objects received in the trough toward the discharge end of the auger.

The receiving assembly 165 includes an elongated spray head 180 extending along the trough 175 beneath the friction members 30 and 31. This head is connected to a source of water under pressure, as indicated by the arrow 181, and is provided with a plurality of perforations spaced along the trough from which the water sprays toward the auger 166, as indicated by the numeral 182.

OPERATION

The operation of the described embodiment of the present invention is believed to be clearly apparent and is briefly summarized at this point. When the apparatus 10 is in operation, the mechanism 100 continuously drives the friction members 30 and 31 in their described oscillating movements in opposite directions, as indicated by the arrows 132, while water under pressure is sprayed from the spray heads 160 and 180 and the auger 166 is rotated by the mechanism 177. Adherent dried fruits in the relatively large clumps 12 are supplied to the hopper 150 from the source 152 and are urged gravitationally downwardly toward the opening 154, striking the bars 156 and being framented thereby into smaller, but still relatively large, clumps 190. These clumps are then gravitationally deposited between the members and are there oppositely engaged by the textured surfaces 47 and 48 of the sheets 45 of woven metal mesh material.

As the clumps 190 are engaged by the textured surfaces 47 and 48, the simultaneous movements of the friction members 30 and 31 in opposite directions results in the surfaces rubbing in opposite directions on the opposite side portions of each clump. This rubbing action of the textured surfaces urges the individual fruits from the clumps and substantially separates the fruits from the clumps. The oscillating movements of the members toss the clumps rotationally in opposite directions, facilitating this separation. Separation of the fruits is also facilitated by moisture from the spray head 160 which lubricates the fruits as they are exposed on the surfaces of the clumps. As the clumps are reduced in size, they move downwardly between the convergent surfaces, as indicated by the arrows 192, toward the lower portions 52 so that the sides of the clumps continue to undergo rubbing action as the clumps are reduced in size due to separation of the fruits therefrom. The substantially separated fruits, indicated by the numeral 194, are gravitationally deposited downwardly from between the surfaces toward the receiving assembly 165.

At the receiving assembly 165, the substantially separated fruits 194 fall into the receiving end 168 of the auger 166 where they are further lubricated by moisture from the spray 182 and are urged along the trough 175 toward the discharge end 169 of the auger. The interrupted nature of the flights 171 contributes to the tumbling action and facilitates the final separation of the clumps 12 into the individual fruits 14 which are discharged from the auger for packaging or the like.

The apparatus 10 thus separates the large clumps 12 of adhering dried fruits into the individual fruits 14. The separation is performed primarily by the rubbing action of the textured surfaces 47 and 48 on the clumps 190 so that the individual fruits are not damaged during the separation. Only sufficient water is applied to the fruits by the spray heads 160 and 180 to lubricate the fruits, further minimizing damage incident to separation. While it is sometimes advantageous to employ the sprays 182 and 162, particularly if the fruit is excessively dry, it is not necessary to do so and under most conditions, effective separation is achieved without the sprays.

The portions of the device contacting the fruits, namely the hopper 150, the sheets 45 of mesh material, the auger 166, and the trough 175 are accessible for cleaning and, preferably, are constructed of material which does not corrode so that the apparatus is easily kept in sanitary condition.

Although the invention has been herein shown and described in what is conceived to be the most practical and preferred embodiment, it is understood that departures may be made therefrom within the scope of the invention, which is not to be limited to the illustrative details disclosed.

Having described my invention, what I claim as new and desire to secure by Letters Patent is:

1. An apparatus for separating clumps of adherent dried fruits and the like comprising:
A. a first member providing a first generally planar, upwardly disposed surface having an upper portion and a lower portion;
B. a second member providing a second generally planar, upwardly disposed surface having an upper portion and a lower portion;
C. means mounting the first member for elevational movement of the first surface in a path substantially parallel to a first predetermined inclined reference plane;
D. means mounting the second member with the second surface disposed in horizontally spaced, facing relation to the first surface for elevational movement of the second surface in a path generally along a second predetermined reference plane inclined in downwardly convergent relation to the first plane so that the upper portion of the second surface moves horizontally substantially away from the upper portion of the first surface during upward movement of the second member and moves horizontally substantially toward the upper portion of the first surface during downward movement of the second member with the angle of inclination of the second surface to the horizontal decreasing during said upward movement and increasing during said downward movement and so that the lower portion of the second surface moves horizontally a substantially shorter distance during the oscillating movement of the second member than the upper portion thereof;
E. drive means for alternately and oppositely reciprocating the first and second members with their respective surfaces moving upwardly and downwardly along their respective paths;
F. means for supplying such clumps of fruit between the first surface and the second surface for opposite engagement thereby during said oscillating movements, the fruit being separated by rubbing action of said surfaces thereagainst;
G. means downwardly spaced from said surfaces for receiving the separated fruit; and
H. a frame having first supports disposed oppositely of the first member from the first surface and second supports disposed oppositely of the second member from the second surface; the means for mounting the first member comprising a pair of vertically spaced, elongated links each having opposite ends individually pivotally connected to the first member and to one of the first supports, said links extending generally horizontally in substantially parallel relation during the oscillating movement of the first member and moving through substantially equal angles above and below the horizontal during said movement; and the means for mounting the second member comprising an elongated upper link and an elongated lower link disposed in vertically spaced relation, each of said links having opposite ends individually pivotally connected to the second member and to one of the second supports, said lower link extending generally horizontally and moving through substantially equal angles above and below the horizontal during the oscillating movement of the second member and said upper link having a substantial upward inclination in a direction from the corresponding second support toward the second member when said member is at the lower extremity of the oscillating movement thereof so that said upward inclination increases substantially as the second member moves upwardly from said extremity and the upper portion of the second member moves horizontally toward said corresponding second support and so that said upward inclination decreases substantially as the second member moves downwardly toward said extremity and said upper portion moves horizontally from said corresponding support.

2. An apparatus for separating clumps of adhering dried fruit comprising:

A. a frame;
B. a first inclined, planar, textured member having an upper portion and a lower portion;
C. a second inclined, planar, textured member having an upper portion and a lower portion and being disposed in facing, horizontally aligned relation to the first member with the members substantially normal to a common vertical transverse plane of reference and with the upper portions spaced substantially farther apart than the lower portions so that the members are downwardly convergent;
D. powered means for continuously driving said members in opposite upwardly and downwardly oscillating movements;
E. means connecting the frame and the lower portions for guiding said portions during said oscillating movements in individual, substantially vertical paths;
F. means connecting the frame and the upper portion of the first member for guiding said portion during the oscillating movement of said member in a path which is substantially vertical so that the first member moves in substantial parallelism;
G. means connecting the frame and the upper portion of the second member for guiding said portion during the oscillating movement of said member in a path which extends upwardly and away from the first member so that the included angle between said members increases as the second member moves upwardly and decreases as the second member moves downwardly;
H. means for depositing said clumps downwardly between said members for engagement oppositely thereby during said oscillating movements thereof so that a rubbing action of the members in opposite directions on opposite portions of each clump substantially separates the fruit therefrom, the separated fruit being urged downwardly gravitationally between said members toward said lower portions; and
I. means for receiving the substantially separated fruit downwardly of the members; the means for driving said members comprising:
(1) a first connecting rod extending generally parallel to the first planar member and having an end pivotally connected thereto and an opposite end;
(2) a crankshaft mounted on the frame for rotation about a horizontal axis and providing a crank pin pivotally connected to said opposite end;
(3) a second connecting rod extending generally parallel to said path of the upper portion of the second planar member and having an end pivotally connected thereto and an opposite end;
(4) a crankshaft mounted on the frame for rotation about a horizontal axis and providing a crank pin pivotally connected to said opposite end of the second connecting rod;
(5) means connecting the crankshafts for simultaneous rotation at the same angular velocity with the relative angular positions of the crankshafts being such that, at one point in their rotation, the first member is disposed substantially at the upper extremity of the oscillating movement thereof and the second member is disposed substantially at the lower extremity of the oscillating movement thereof, the first member being disposed substantially at the lower extremity of the oscillating movement thereof and the second member being disposed substantially at the upper extremity of the oscillating movement thereof when the crankshafts have rotated one-half of a revolution from said point; and
(6) a power drive connected in rotational driving relation to one of the crankshafts.

3. An apparatus for separating clumps of adhering dried fruit comprising:

A. a frame;
B. a first inclined, planar, textured member having an upper portion and a lower portion;
C. a second inclined, planar, textured member having an upper portion and a lower portion and being disposed in facing, horizontally aligned relation to the first member with the members substantially normal to a common vertical transverse plane of reference and with the upper portions spaced substantially farther apart than the lower portions so that the members are downwardly convergent;
D. powered means for continuously driving said members in opposite upwardly and downwardly oscillating movements;
E. means connecting the frame and the lower portions for guiding said portions during said oscillating movements in individual, substantially vertical paths;
F. means connecting the frame and the upper portion of the first member for guiding said portion during the oscillating movement of said member in a path which is substantially vertical so that the first member moves in substantial parallelism;
G. means connecting the frame and the upper portion of the second member for guiding said portion during the oscillating movement of said member in a path which extends upwardly and away from the first member so that the included angle between said members increases as the second member moves upwardly and decreases as the second member moves downwardly;
H. means for depositing said clumps downwardly between said members for engagement oppositely thereby during said oscillating movements thereof so that a rubbing action of the members in opposite directions on opposite portions of each clump substantially separates the fruit therefrom, the separated fruit being urged downwardly gravitationally between said members toward said lower portions; and I. means for receiving the substantially separated fruit downwardly of the members; the means for depositing the clumps comprising a hopper disposed upwardly of said first member and said second member, the hopper providing a downwardly disposed discharge opening centrally between the members and including a bar extended above the opening to fragment the clumps prior to deposit between said members.

4. An apparatus for separating clumps of adhering dried fruit comprising:

A. a frame;

B. a first inclined, planar, textured member having an upper portion and a lower portion;

C. a second inclined, planar, textured member having an upper portion and a lower portion and being disposed in facing, horizontally aligned relation to the first member with the members substantially normal to a common vertical transverse plane of reference and with the upper portions spaced substantially farther apart than the lower portions so that the members are downwardly convergent;

D. powered means for continuously driving said members in opposite upwardly and downwardly oscillating movements;

E. means connecting the frame and the lower portions for guiding said portions during said oscillating movements in individual, substantially vertical paths;

F. means connecting the frame and the upper portion of the first member for guiding said portion during the oscillating movement of said member in a path which is substantially vertical so that the first member moves in substantial parallelism;

G. means connecting the frame and the upper portion of the second member for guiding said portion during the oscillating movement of said member in a path which extends upwardly and away from the first member so that the included angle between said members increases as the second member moves upwardly and decreases as the second member moves downwardly;

H. means for depositing said clumps downwardly between said members for engagement oppositely thereby during said oscillating movements thereof so that a rubbing action of the members in opposite directions on opposite portions of each clump substantially separates the fruit therefrom, the separated fruit being urged downwardly gravitationally between said members toward said lower portions;

I. means for receiving the substantially separated fruit downwardly of the members; and J. means for spraying liquid between said first member and said second member onto fruit engaged thereby.

5. An apparatus for separating clumps of adhering dried fruit comprising:

A. a frame;

B. a first inclined, planar, textured member having an upper portion and a lower portion;

C. a second inclined, planar, textured member having an upper portion and a lower portion and being disposed in facing, horizontally aligned relation to the first member with the members substantially normal to a common vertical transverse plane of reference and with the upper portions spaced substantially farther apart than the lower portions so that the members are downwardly convergent;

D. powered means for continuously driving said members in opposite upwardly and downwardly oscillating movements;

E. means connecting the frame and the lower portions for guiding said portions during said oscillating movements in individual, substantially vertical paths;

F. means connecting the frame and the upper portion of the first member for guiding said portion during the oscillating movement of said member in a path which is substantially vertical so that the first member moves in substantial parallelism;

G. means connecting the frame and the upper portion of the second member for guiding said portion during the oscillating movement of said member in a path which extends upwardly and away from the first member so that the included angle between said members increases as the second member moves upwardly and decreases as the second member moves downwardly;

H. means for depositing said clumps downwardly between said members for engagement oppositely thereby during said oscillating movements thereof so that a rubbing action of the members in opposite directions on opposite portions of each clump substantially separates the fruit therefrom, the separated fruit being urged downwardly gravitationally between said members toward said lower portions; and I. means for receiving the substantially separated fruit downwardly of the members; the means for receiving the substantially separated fruit comprising a horizontally extending auger having a receiving end disposed centrally beneath the respective lower portions of said first member and said second member to receive the substantially separated fruit and having an opposite discharge end, and a spray head connected to a source of liquid under pressure to spray said liquid onto the substantially separated fruit at the receiving end, the substantially separated fruit being subsequently tumbled by the auger and further separated thereby during transportation therealong to the discharge end.

6. An apparatus for separating clumps of adherent dried fruit and the like comprising:

A. a frame having opposite sides;

B. a pair of substantially planar downwardly convergent friction members;

C. means mounting one of the members in the frame between the sides thereof comprising (1) a pair of vertically spaced, elongated links each having opposite ends individually pivotally connected to said one member and to an adjacent side of the frame, such links extending generally horizontally in substantially parallel relation and being movable through substantially equal angles above and below the horizontal;

D. means for mounting the other member in the frame comprising:

(1) an elongated upper link and an elongated lower link disposed in vertically spaced relation, each of said links having opposite ends individually pivotally connected to said other member and to an adjacent side of the frame, the lower link extending generally horizontally and being movable through substantially equal angles above and below the horizontal and the upper link having a substantial upward inclination in a direction from its connection to the side of the frame to said other member when said other member is at the lower extremity of the movement thereof so that said upward inclination increases substantially as said other member moves upwardly from said extremity and the upper end of said other member moves toward the side of the frame to which it is connected and so that said upward inclination decreases substantially as said other member moves downwardly toward said extremity and said upper end moves away from the side of the frame to which it is connected;

E. drive means for alternately and oppositely elevationally reciprocating said members;

F. means for supplying clumps of fruit between said members for separation by rubbing action of the friction members thereagainst; and G. means disposed beneath said members for receiving separated fruit therefrom.

* * * * *

UNITED STATES PATENT AND TRADEMARK OFFICE
CERTIFICATE OF CORRECTION

PATENT NO. : 4,288,314
DATED : September 8, 1981
INVENTOR(S) : Edward J. Derderian It is certified that error appears in the above-identified patent and that said Letters Patent are hereby corrected as shown below:

Column 6, line 21, change "151" to ---152---.

Signed and Sealed this

Third Day of November 1981

[SEAL]

Attest:

GERALD J. MOSSINGHOFF

Attesting Officer     Commissioner of Patents and Trademarks